United States Patent
Majewicz et al.

(10) Patent No.: US 9,516,238 B2
(45) Date of Patent: Dec. 6, 2016

(54) NOISE SUPPRESSION

(75) Inventors: Peter I. Majewicz, Boise, ID (US);
Jennifer L. Melin, Boise, ID (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1242 days.

(21) Appl. No.: 13/024,885

(22) Filed: Feb. 10, 2011

(65) Prior Publication Data
US 2012/0206628 A1 Aug. 16, 2012

(51) Int. Cl.
*H04N 5/235* (2006.01)
*H04N 5/217* (2011.01)

(52) U.S. Cl.
CPC .......... *H04N 5/2354* (2013.01); *H04N 5/2176* (2013.01)

(58) Field of Classification Search
USPC ........ 348/241, 243, 248, 370, 371; 382/254, 382/260, 274
See application file for complete search history.

(56) References Cited

U.S. PATENT DOCUMENTS

| | | | |
|---|---|---|---|
| 3,800,079 A | 3/1974 | McNeil et al. | |
| 4,636,850 A | 1/1987 | Stewart | |
| 5,557,358 A | 9/1996 | Mukai et al. | |
| 5,729,640 A | 3/1998 | Castonguay | |
| 6,021,210 A | 2/2000 | Camus et al. | |
| 7,948,538 B2* | 5/2011 | Asoma | 348/297 |
| 2002/0113882 A1* | 8/2002 | Pollard et al. | 348/239 |
| 2007/0201853 A1 | 8/2007 | Petschnigg | |
| 2008/0036885 A1* | 2/2008 | Nakakuki | 348/269 |
| 2008/0106636 A1 | 5/2008 | Wernersson | |
| 2010/0111381 A1 | 5/2010 | McBeth et al. | |
| 2012/0177352 A1* | 7/2012 | Pillman et al. | 396/61 |

OTHER PUBLICATIONS http://www.pixim.com/news-and-events/press-releases/THE-ECLIPSE-REAL-TIME-AMBIE REJECTION-CAMERA; Jan. 2, 2013.

* cited by examiner

*Primary Examiner* — Roberto Velez
*Assistant Examiner* — Yih-Sien Kao
(74) *Attorney, Agent, or Firm* — Rathe Lindenbaum LLP (57) ABSTRACT

A method and apparatus apply one of a plurality of different levels of noise suppression to a pixel based on a difference between illuminance values for the pixel in the presence of (a) both a flash and ambient light and (b) without the flash.

23 Claims, 8 Drawing Sheets

NOISE SUPPRESSION

BACKGROUND

Variations in ambient light may introduce noise into a captured image. Overpowering the ambient light with a flash may increase cost and complexity. Current methods of digitally removing ambient light may be costly in terms of both processing speed and expense.

DETAILED DESCRIPTION OF THE EXAMPLE EMBODIMENTS

Figure 1:
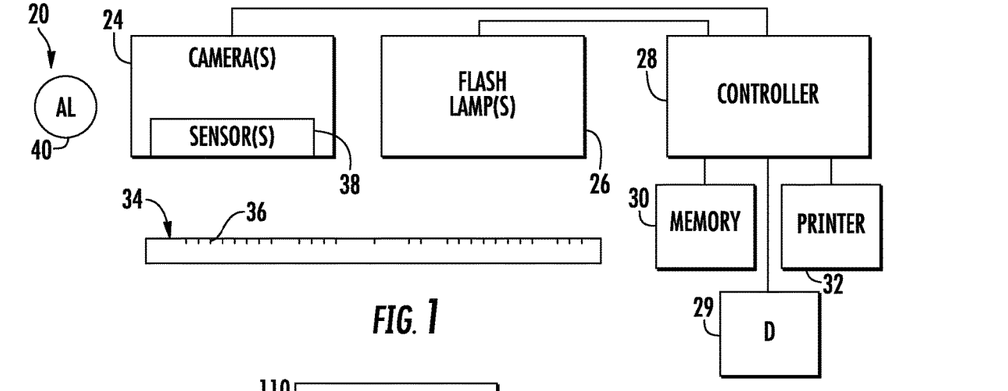
FIG. 1 is a schematic illustration of an image capture system according to an example embodiment.

FIG. 1 schematically illustrates an image capture system 20 according to an example embodiment. Image capture system 20 is configured to capture and store, transmit, or print a captured image of a scene. As will be described hereafter, image capture system 20 reduces noise in the captured image that may be introduced by ambient light with less processing and in a cost-effective manner.

Image capture system 20 comprises camera 24, flash lamp 26, controller 28, display 29, memory 30 and printer 32. Camera 24 comprises one or more cameras configured to digitally capture image frames of a scene shown as a document 34 having text and graphics 36. For purposes of this disclosure, the term "scene" shall mean anything which may be scanned or digitally captured up close or from a distance. For example, a "scene" may comprise a two-dimensional sheet or document having a face containing graphics, pictures or text. A "scene" may also comprise a book or a three-dimensional article. A "scene" may comprise a portrait, a landscape, or objects and their surrounding environment or landscape.

Camera 24 comprises one or more sensors 38 configured to sense light and generate signals representing the light. In one embodiment, the one or more sensors 38 comprise one or more charge coupled devices (CCD). In other embodiments, sensors 38 may comprise other sensing devices or elements, such as complementary metal oxide semiconductor (CMOS), configured to sense light from a scene.

Flash lamp 26 comprises one or more lamps configured to serve as a source of illumination for the scene being captured by camera 24. In the example embodiment illustrated, flash lamp 26 provides an overall flash having an illumination insufficient to overpower existing ambient light 40 (schematically shown). In the example illustrated, flash lamp 26 provides an overall flash having a luminance of less than or equal to about 1500 LUX and nominally less than or equal to about 900 LUX. Because image capture system 20 reduces noise that may be introduced by ambient light in a digital fashion, rather than relying upon use of a flash to overpower ambient light, flash lamp 26 may comprise a lower power and generally less expensive lamp or other sources of illumination. In the example illustrated, flash lamp 26 comprises one or more light emitting diode (LED) flash lamps. In other embodiments, flash lamp 26 may comprise other sources of a flash, such as tungsten or fluorescent lamp technologies, or scene illumination.

Controller 28 comprises one or more processing units configured: (1) to generate control signals for the control of camera 24 and flash lamp 26; (2) to receive the signals from camera 24 corresponding to or representing the image frames of the captured scene; (3) to enhance the image by applying adaptive noise suppression to digitally reduce or filter out noise that may be introduced by ambient light; and (4) to display the enhanced image on display 29, to store the enhanced image in memory 30, to transmit the image over a communication channel, and/or print the enhanced image using printer 32.

For purposes of this application, the term "processing unit" shall mean a presently developed or future developed processing unit that executes sequences of instructions contained in a memory. Execution of the sequences of instructions causes the processing unit to perform steps such as generating control signals. The instructions may be loaded in a random access memory (RAM) for execution by the processing unit from a read only memory (ROM), a mass storage device, or some other persistent storage. In other embodiments, hard wired circuitry may be used in place of or in combination with software instructions to implement the functions described. For example, controller 28 may be embodied as part of one or more application-specific integrated circuits (ASICs). Unless otherwise specifically noted, the controller is not limited to any specific combination of hardware circuitry and software, nor to any particular source for the instructions executed by the processing unit.

Display 29 comprises one or more devices configured to display the enhanced image produced by controller 28 from the captured image frames of the scene. Display 29 may comprise a monitor, a touch screen, a television or any other such device. In some embodiments, display 29 may be omitted or may not be used to display the enhanced image.

Memory 30 comprises a persistent storage device configured to store at least the enhanced image produced by controller 28. In one embodiment, memory 30 may be the same memory containing instructions for the direction of the one or more processing units of controller 28. In one embodiment, memory 30 may be physically part a single unit including camera 24, flash lamp 26 and controller 28. In another embodiment, memory 30 may be separate and distinct from camera 24, flash lamp 26 and controller 28, wherein memory 30 is communicatively connected to controller 28 in a wired or wireless fashion or through a network or the Internet. In some embodiments, memory 30 may be omitted.

Printer 32 comprises a device configured to print or form the enhanced image produced by controller 28 onto a print medium such as a sheet or document. In one embodiment, printer 32 may comprise a drop-on-demand inkjet printer. In another embodiment, printer 32 may comprise an electrophotographic or laser printer. In yet other embodiments, printer 32 may comprise other devices for forming the enhanced image on a print medium. In some embodiments, printer 32 may be remote from controller 28, wherein the printer 28 is communicatively coupled to controller 28 over a network or by a wired connection such as a USB connection. In some embodiments, printer 32 may be omitted.

Figure 2:
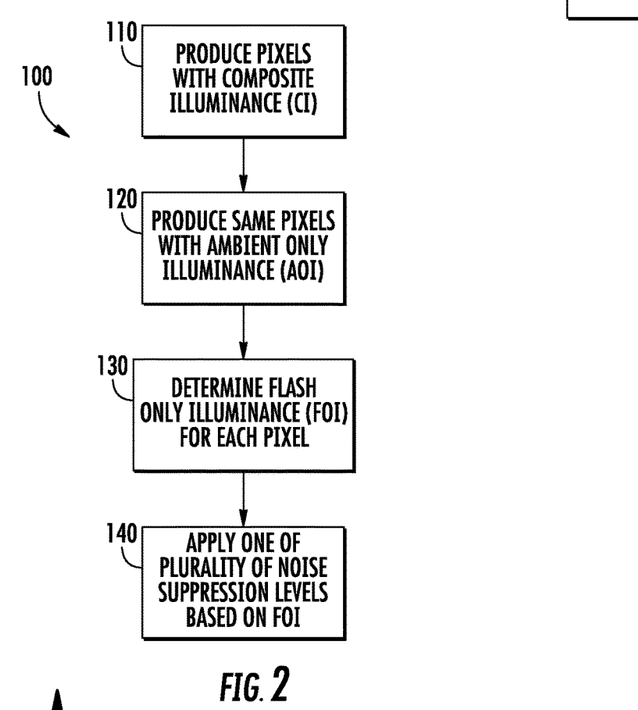
FIG. 2 is a flow diagram of a method for suppressing noise that may be carried out by the image capture system of FIG. 1 according to an example embodiment.

FIG. 2 is a flow diagram of a process or method 100 that may be carried out by image capture system 20 under the control of controller 28 to reduce noise introduced by ambient light. As indicated by step or block 110, camera 24 is positioned opposite to or respect to the scene to be captured (such as scene 34 of FIG. 1). Likewise, flash lamp 26 is also appropriately positioned with respect to the scene to be captured. In some embodiments, the scene to be captured may also or alternatively be manipulated or positioned with respect to camera 24 and flash lamp 26. Once camera 24, flash lamp 26 and the scene are appropriately positioned with respect to one another, a first image frame of the scene in the presence of a flash produced by flash lamp 26 is digitally captured by sensors 38 of camera 24. In one embodiment, camera 24 and flash lamp 26 are both actuated in response to signals from controller 28. In another embodiment, camera 24 and lamp 26 are actuated manually, wherein the signals produced by camera 24 are transmitted to controller 28.

In the example illustrated, the flash provided by flash lamp 26 provides an illuminance of less than or equal to 1500 LUX and nominally less than or equal to 900 LUX. In one embodiment, the illumination or flash provided by flash lamp 26 may be temporary, starting at or just before the capture of light by sensors 38 and terminating at or shortly after the capture of light by sensors 38. In another embodiment, the illumination of flash provided by flash lamp 26 may be prolonged, the period of lighting extending well before and/or well after the capture of light by sensors 38. In other embodiments, the illumination provided by flash lamp 26 may have other illuminance values or intensities.

The resulting first captured image frame produces pixels of the scene, wherein each pixel of the scene in the first captured image frame has a composite illuminance value (CI), also sometimes referred to as flash illuminance. For purposes of this disclosure, the term "composite illuminance" means the illuminance of the pixel including contributions from both ambient light 40 and flash lamp 26.

As indicated by step or block 120, sensors 38 of camera 24 digitally capture a second image frame of the same scene without any flash produced by flash lamp 26. In one embodiment, camera 24 and flash lamp 26 are both actuated in response to signals from controller 28. In another embodiment, camera 24 and lamp 26 are actuated manually, wherein the signals produced by camera 24 are transmitted to controller 28. The resulting second captured image frame produces the same scene pixels of the same scene. In other words, the first image frame of the scene and the second image frame of the scene include the same pixels which represent the same portions of the scene. Unlike the pixels of the first image frame having composite illuminance values, the corresponding pixels of a second image have ambient only illuminance values (AOI). For purposes of this disclosure, the term "ambient only illuminance" means the illuminance of the pixel includes contributions only from ambient light 40 and not from flash lamp 26.

Although method 100 depicts the producing of pixels with composite illuminance values prior to producing pixels with ambient only illuminance values, this order may be reversed. In particular, in other embodiments, the image frame in the absence of illumination from flash lamp 26 may be captured first, preceding the capture of the image frame with illumination from flash lamp 26.

As indicated by step or block 130, controller 28 receives the signals from camera 24 representing the scene pixels having composite illuminance values and the same scene pixels with ambient only illuminance values. From the signals or data, controller 28 determines a pure lamp illuminance or flash only illuminance (FOI) value for each pixel of the scene. In the example illustrated, controller 28 determines the pure lamp illuminance or flash only illuminance value for each pixel of the scene by subtracting the ambient only the illuminance value of the pixel from the composite illuminance value of the pixel.

As indicated by step or block 140, controller 28 applies one of a plurality of noise suppression levels to the flash only illuminance value of each scene pixel based at least upon the determined flash only illuminance value for the pixel. For example, if the flash only illuminance value for a particular pixel has a first value, controller 28 may apply a first level or amount of noise suppression by applying a first illuminance value adjustment scheme or equation to the pixel. If the particular pixel alternatively has a second different flash only illuminance value, controller 28 may apply a second different level or amount of noise suppression to the pixel. For purposes of this disclosure, one of the different noise suppression levels may be the application of no noise suppression, wherein the filtered illuminance value (FIV), the illuminance value for the pixel that is displayed, stored, transmitted, and/or printed, is the flash only illuminance for the particular pixel.

Figure 3:
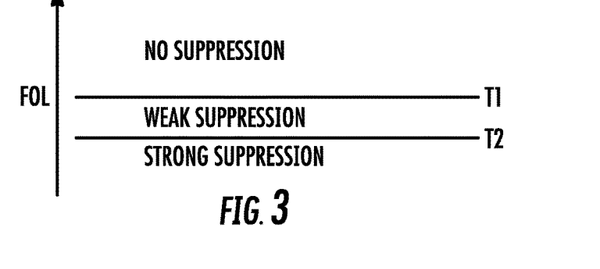
FIG. 3 is a diagram illustrating one example of a noise suppression scheme in which one of a plurality of noise suppression levels may be applied.

FIG. 3 is a diagram depicting one example scheme or set of criteria for applying different levels of noise suppression to a particular pixel based upon a determined flash only illuminance value of the pixel. In the example illustrated, controller 28 applies three levels of noise suppression to the illuminance value for the particular pixel depending upon the determined flash only illuminance value for the pixel. If the FOI is greater than threshold T1, controller 28 applies no suppression. In other words, the filtered illuminance value (FIV), the illuminance value for the pixel that is displayed, stored and/or printed, is the FOI value for the particular pixel. If the FOI value is greater than threshold T2, but less than or equal to the threshold T1, controller 28 applies a second weak level of noise suppression. If the FOI value is less than threshold T2, controller 28 applies a third strong level or greater amount of noise suppression. The example scheme applies more noise suppression to darker pixels.

In one embodiment, the weak level of noise suppression may comprise a digital speckle removal filter. In one embodiment, the strong level of noise suppression may comprise a digital smoothing filter. In one embodiment, threshold T1 is 32 digital counts out of a total of 255 whereas threshold T2 is 16 digital counts. In other embodiments, other thresholds may be utilized. In other embodiments, controller 28 may apply additional or fewer of such noise suppression levels, adjustment rules or equations.

In one embodiment, the noise suppression level within each range, i.e. between the thresholds, may be constant. In other embodiments, the noise suppression may slightly vary within each range based upon the proximity of the FOI value to the thresholds or based upon other additional factors. For example, in one embodiment, the level of noise suppression for FOI values between thresholds T1 and T2 may continuously or stepwise increase based on a formula or algorithm as the FOI value approaches threshold T2. Likewise, the level of noise suppression may continuously or stepwise increase based on a formula or algorithm as the FOI value becomes increasingly less than threshold T2.

Figure 4:
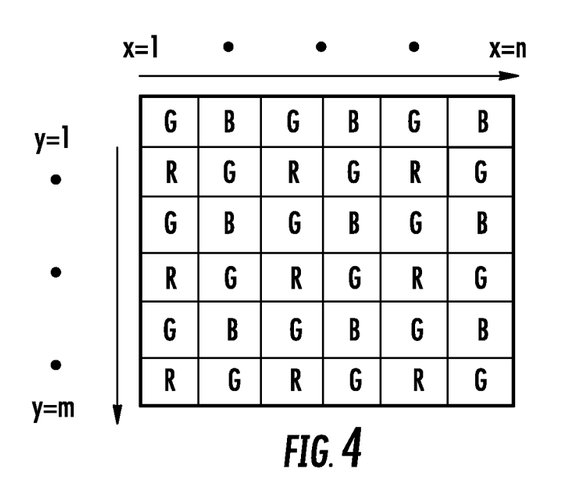
FIG. 4 is a diagram of a portion of an image frame in a Bayer Mosaic format according to an example embodiment.

FIG. 4 illustrates one example format for each of the first image frame and the second image frame which are used by controller 28 to determine which of the plurality of noise suppression levels to apply to a particular pixel. In the example shown in FIG. 4, the first and second image frames are each in the Bayer Mosaic format. FIG. 4 illustrates a portion of the overall Bayer Mosaic two-dimensional grid or array which comprises the illustrated pattern or arrangement of green (G), blue (B) and red (R) pixels having x, y coordinates, wherein x ranges from 1 to n and y ranges from 1 to m, and wherein n and m depend upon the dimensions of the overall two-dimensional grid of camera 24. In the example illustrated, the Bayer Mosaic format is the raw image format produced by camera 24. In the example illustrated, controller 20 performs noise suppression on each of the pixels of the Bayer Mosaic Format in a raster order, i.e. left to right with on a row by row basis (x=1, y=1 . . . x=n, y=1; x=1, y=2 . . . x=n, y=2 and so on).

Because controller 28 suppresses noise on a pixel-by-pixel basis operating in the raw Bayer Mosaic format rather than a demosaiced format, controller 28 may perform the noise suppression operations in approximately one third the time since the Bayer Mosaic format contains two thirds fewer pixels than a demosaiced format. In addition, because controller 28 performs noise suppression operations to correct "noisy" pixels prior to the noisy pixels going through the demosaic interpolation process, noisy pixels are less likely to spread out and corrupt neighboring pixels during the interpolation process and the spreading of noise between color channels due to the use of cross terms by the demosaic algorithm is reduced.

Figure 5:
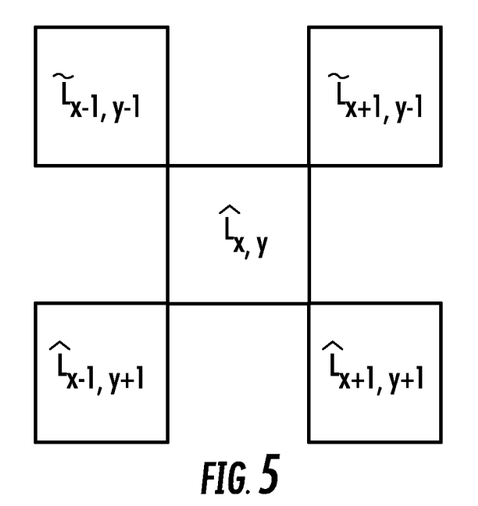
FIG. 5 is a diagram of a green scene pixel $L_{x,y}$ of captured image frames in the Bayer Mosaic format undergoing noise suppression and some of the surrounding pixels used in noise suppression.
Figure 6:
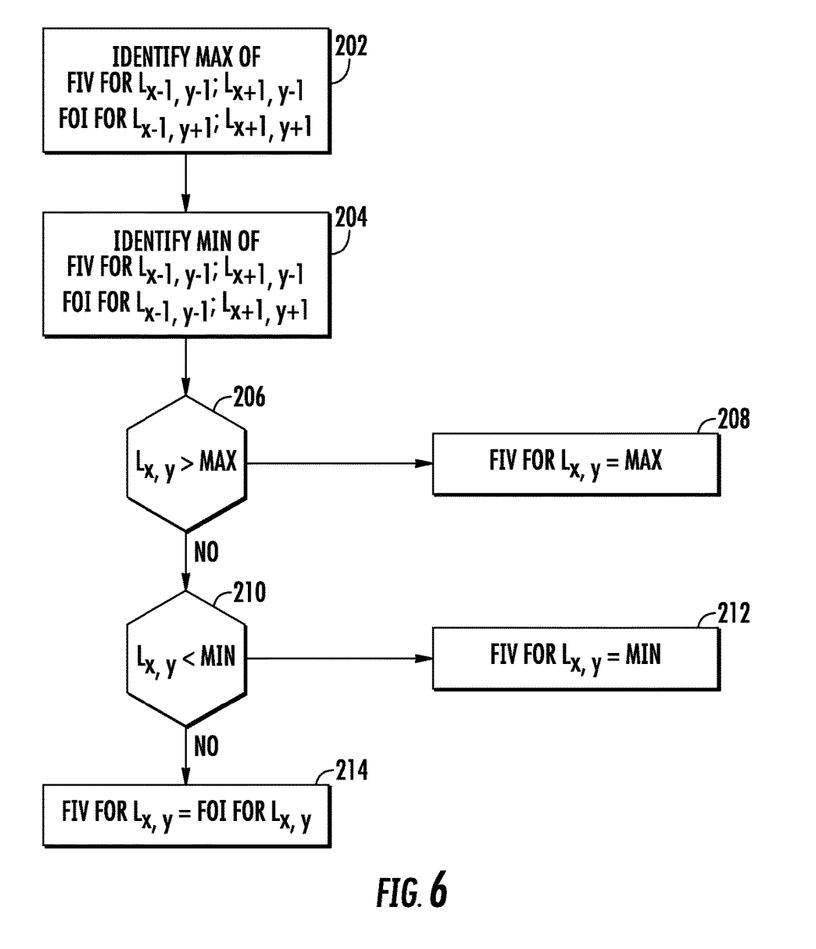
FIG. 6 is a flow diagram of a method of suppressing noise for the green scene pixel $L_{x,y}$ of FIG. 5 according to an example embodiment.

FIGS. 5-6 illustrate the application of one particular level of noise suppression that may be applied by controller 28. In particular, FIGS. 5-6 illustrate one example of a despeckle digital filter—a weak suppression strength filter. FIG. 5 illustrates a green scene pixel $L_{x,y}$ of the captured image frames in the raw Bayer Mosaic format undergoing noise suppression and some of the surrounding pixels use in the process of noise suppression. Those pixels for which a filtered illuminance value has already been determined by the previous raster line processing and which are used in the noise suppression are identified with a tilde. Those pixels for which a filtered illuminance value has not yet been determined, but from which the flash only illuminance value is used in the noise suppression are identified with a carrot.

FIG. 6 is a flow diagram of the process 200 for performing noise suppression on the particular green pixel $L_{x,y}$. As indicated by step or block 202, controller 28 identifies or determines the maximum illuminance value out of the set of illuminance values comprising the filtered illuminance values for pixels $L_{x-1,y-1}$ and $L_{x+1, y-1}$ and the flash only illuminance values for pixels $L_{x-1, y+1}$ and $L_{x+1, y+1}$. As indicated by step or block 204, controller 28 identifies or determines the minimum illuminance value out of the set of illuminance values comprising the filtered illuminance values for pixels $L_{x-1,y-1}$ and $L_{x+1, y-1}$ and the flash only illuminance values for pixels $L_{x-1, y+1}$ and $L_{x+1, y+1}$.

As indicated by steps or blocks 206, 208, 210, 212 and 214, controller 28 clamps the flash only illuminance value for the pixel $L_{x,y}$ between the identified maximum (Max) and minimum (Min). Controller 28 sets the filtered illuminance value for the pixel $L_{x,y}$ as the clamped flash only illuminance value. In particular, as indicated by steps 206 and 208, if the flash only illuminance value for pixel $L_{x,y}$ is greater than the identified Max, controller 28 sets the filtered illuminance value equal to the maximum illuminance value. As indicated by steps 210 and 212, if the flash only illuminance value for pixel $L_{x,y}$ is less than the identified Min, controller 28 sets the filtered illuminance value equal to the minimum illuminance value. As indicated by step 214, if the flash only illuminance value is between identified Max and the identified Min, controller 28 sets the filtered illuminance value equal to the flash only illuminance value for the pixel $L_{x,y}$.

Figure 7:
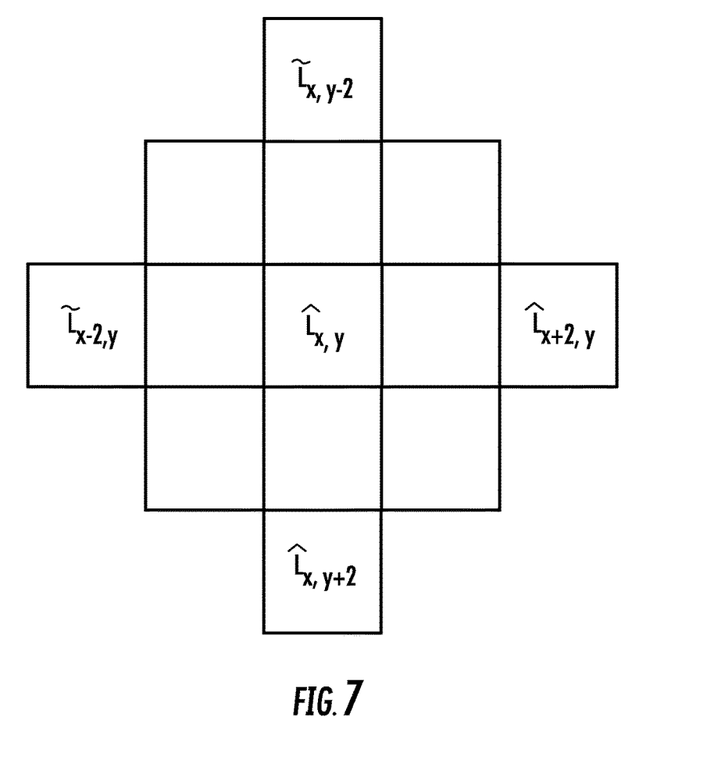
FIG. 7 is a diagram of a red or blue scene pixel $L_{x,y}$ of captured image frames in the raw Bayer Mosaic format undergoing noise suppression and some of the surrounding pixels used in noise suppression.
Figure 8:
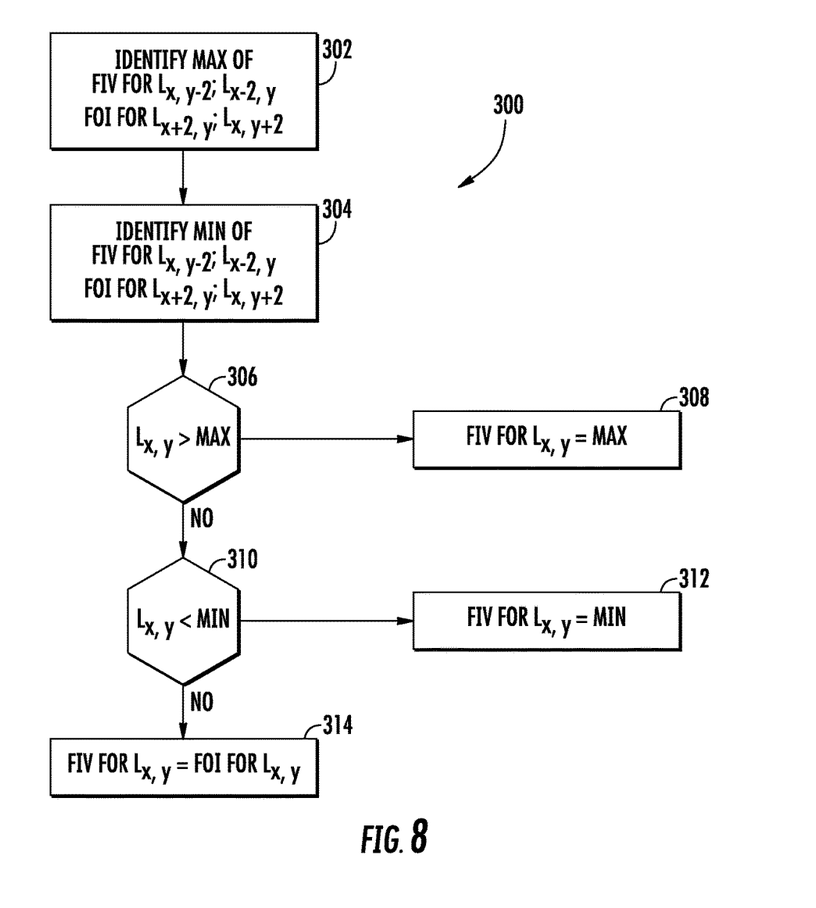
FIG. 8 is a flow diagram of a method of suppressing noise for the red or blue scene pixel $L_{x,y}$ of FIG. 7 according to an example embodiment.

FIGS. 7-8 illustrate the application of the noise suppression of FIGS. 5 and 6 to a red or blue pixel of the same scene in the raw Bayer Mosaic format shown in FIG. 4. FIG. 7 illustrates a red or blue scene pixel $L_{x,y}$ of the captured image frames in the raw Bayer Mosaic format undergoing noise suppression and some of the surrounding pixels use in the process of noise suppression. Those pixels for which a filtered illuminance value has already been determined and which are used in the noise suppression are identified with a tilde. Those pixels for which a filtered illuminance value has not yet been determined, but from which the flash only illuminance value is used in the noise suppression are identified with a carrot.

FIG. 8 is a flow diagram of the process 300 for performing noise suppression on the particular pixel $L_{x,y}$. As indicated by step or block 302, controller 28 identifies or determines the maximum illuminance value out of the set of illuminance values comprising the filtered illuminance values for pixels $L_{x,y-2}$ and $L_{x-2, y}$ and the flash only illuminance values for pixels $L_{x+2, y}$ and $L_{x, y+2}$. As indicated by step or block 304, controller 28 identifies or determines the minimum illuminance value out of the set of illuminance values comprising the filtered illuminance values for pixels $L_{x,y-2}$ and $L_{x-2, y}$ and the flash only illuminance values for pixels $L_{x+2}$, y and $L_{x, y+2}$.

As indicated by steps or blocks 306, 308, 310, 312 and 314, controller 28 clamps the flash only illuminance value for the pixel $L_{x,y}$ between the identified maximum (Max) and minimum (Min). Controller 28 sets the filtered illuminance value for the pixel $L_{x,y}$ as the clamped flash only illuminance value. In particular, as indicated by steps 306 and 308, if the flash only illuminance value for pixel $L_{x,y}$ is greater than the identified Max, controller 28 sets the filtered illuminance value equal to the maximum illuminance value. As indicated by steps 310 and 212, if the flash only illuminance value for pixel $L_{x,y}$ is less than the identified Min, controller 28 sets the filtered illuminance value equal to the minimum illuminance value. As indicated by step 314, if the flash only illuminance value is between identified Max and the identified Min, controller 28 sets the filtered illuminance value equal to the flash only illuminance value for the pixel $L_{x,y}$.

Figure 9:
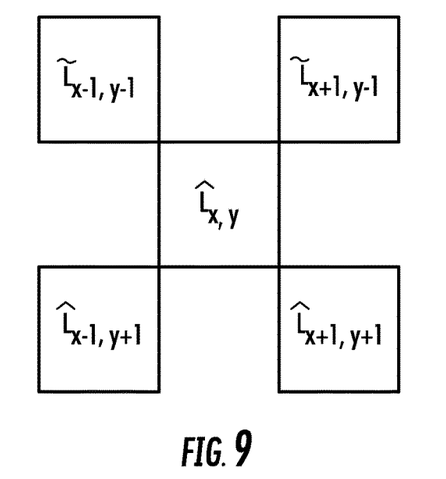
FIG. 9 is a diagram of a green scene pixel $L_{x,y}$ of a captured image frames in the Bayer Mosaic format undergoing noise suppression and some of the surrounding pixels used in noise suppression.
Figure 10:
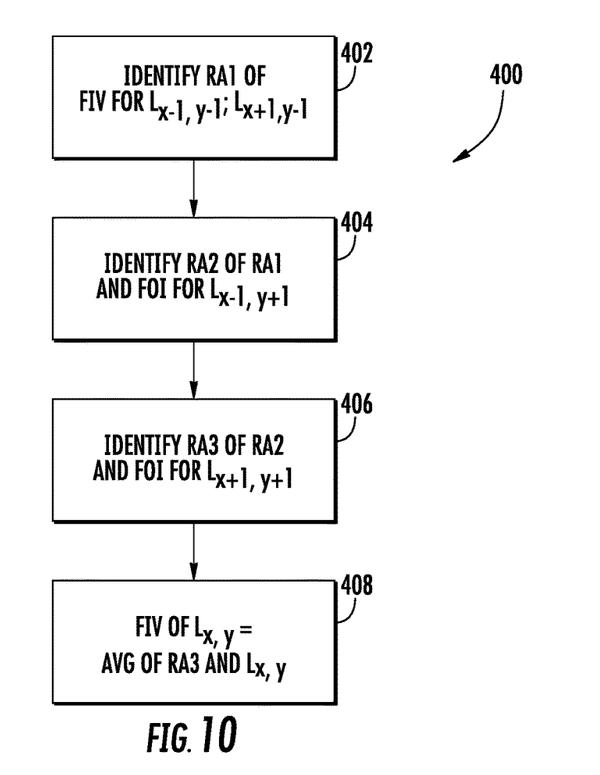
FIG. 10 is a flow diagram of another method of suppressing noise for the green scene pixel $L_{x,y}$ of FIG. 9 according to an example embodiment.

FIGS. 9-10 illustrate the application of another particular level of noise suppression that may be applied by controller 28. In particular, FIGS. 9-10 illustrate one example of a smoothing digital filter, a relatively strong suppression level. FIG. 9 illustrates a green scene pixel $L_{x,y}$ of the captured image frames in the raw Bayer Mosaic format undergoing noise suppression and some of the surrounding pixels use in the process of noise suppression. Those pixels for which a filtered illuminance value has already been determined and which are used in the noise suppression are identified with a tilde. Those pixels for which a filtered illuminance value has not yet been determined, but from which the flash only illuminance value is used in the noise suppression are identified with a carrot.

FIG. 9 is a flow diagram of the process 400 for performing noise suppression on the particular pixel $L_{x,y}$. As indicated by step or block 402, controller 28 determines a first running average (RA1) by averaging the filtered illuminance values of pixel $L_{x-1, y-1}$ and pixel $L_{x+1, y-1}$. As indicated by step or block 404, controller 28 then determines a second running average (RA2) by averaging the first running average (RA1) and the pure lamp illuminance value of pixel $L_{x-1, y+1}$. According to one embodiment, the neighboring pixel $L_{x-1, y+1}$ is only averaged with RA2 if the pixel $L_{x-1, y+1}$ has a FOI value greater than zero.

As indicated by step or block 406, controller 28 determines a third running average (RA3) by averaging the second running average (RA2) and the pure lamp illuminance value of pixel $L_{x+1, y+1}$. According to one embodiment, the neighboring pixel $L_{x+1, y+1}$ is only averaged with RA2 if the pixel $L_{x+1, y+1}$ has a FOI value greater than zero. As shown by step or block 408, controller 28 lastly averages the third running average (RA3) and the pure lamp or flash only illuminance value of pixel $L_{x, y}$. Controller 28 sets the filtered illuminance value for the pixel $L_{x,y}$ equal to the resulting average of the third running average (RA3) and the pure lamp illuminance value of pixel $L_{x, y}$. According to one embodiment, the FOI value for pixel $L_{x,y}$ is only averaged with RA3 if the pixel $L_{x, y}$ has a FOI value greater than zero. If the FOI value for pixel $L_{x,y}$ is zero or less, controller 28 sets a filtered illuminance value for pixel $L_{x,y}$ equal to the third running average (RA3).

Figure 11:
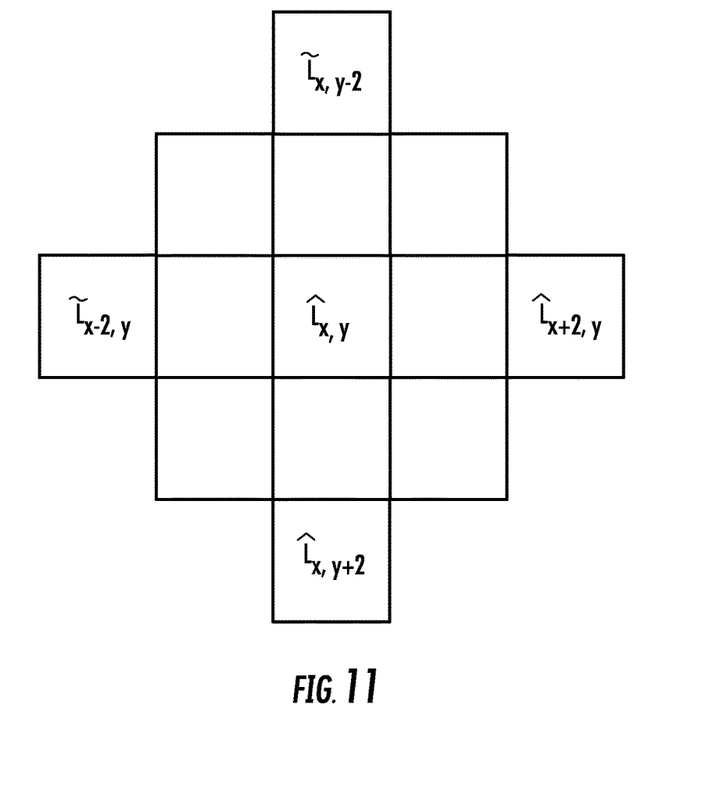
FIG. 11 is a diagram of a red or blue scene pixel $L_{x,y}$ of a captured image frames in the raw Bayer Mosaic format undergoing noise suppression and some of the surrounding pixels used in noise suppression.
Figure 12:
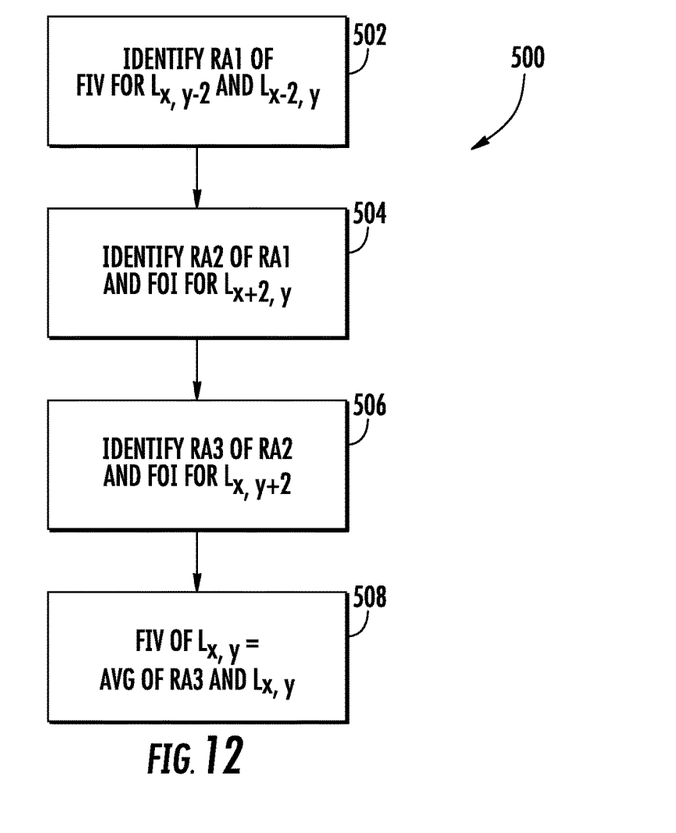
FIG. 12 is a flow diagram of another method of suppressing noise for the bred or blue scene pixel $L_{x,y}$ of FIG. 11 according to an example embodiment.

FIGS. 11-12 illustrate the application of another particular level of noise suppression that may be applied by controller 28. In particular, FIGS. 11-12 illustrate one example of a smoothing digital filter, a relatively strong suppression level. FIG. 11 illustrates a red or blue scene pixel $L_{x,y}$ of the captured image frames in the raw Bayer Mosaic format undergoing noise suppression and some of the surrounding pixels use in the process of noise suppression. Those pixels for which a filtered illuminance value has already been determined and which are used in the noise suppression are identified with a tilde. Those pixels for which a filtered illuminance value has not yet been determined, but from which the flash only illuminance value is used in the noise suppression are identified with a carrot.

FIG. 12 is a flow diagram of the process 500 for performing noise suppression on the particular pixel Ly,x. As indicated by step or block 502, controller 28 determines are identified a first running average (RA1) by averaging the filtered illuminance values of pixel $L_{x, y-2}$ and pixel $L_{x-2, y}$. As indicated by step or block 504, controller 28 determines or identifies a second running average (RA2) by averaging the first running average and the flash only illuminance value of pixel $L_{x+2, y}$. According to one embodiment, the neighboring pixel $L_{x+2, y}$ is only averaged with RA2 if the pixel $L_{x+2, y}$ has a FOI value greater than zero. As indicated by block or step 506, controller 28 identifies or determines a third running average by averaging the second running average (RA2) and the flash only illuminance (pure lamp illuminance) value of pixel $L_{x, y+2}$. According to one embodiment, the neighboring pixel $L_{x, y+2}$ is only averaged with RA2 if the pixel $L_{x, y+2}$ has a FOI value greater than zero. As indicated by step or block 508, controller 28 controller 28 lastly averages the third running average (RA3) and the flash only illuminance value of pixel $L_{x, y}$. Controller 28 sets the filtered illuminance value for the pixel $L_{x,y}$ equal to the resulting average of the third running average (RA3) and the flash only or pure illuminance value of pixel $L_{x, y}$. According to one embodiment, the FOI value for pixel $L_{x,y}$ is only averaged with RA3 if the pixel $L_{x, y}$ has a FOI value greater than zero. If the FOI value for pixel $L_{x,y}$ is zero or less, controller 28 sets a filtered illuminance value for pixel $L_{x,y}$ equal to the third running average (RA3).

In both of methods 400 and 500, the order in which the pixels are included in the running averages by controller 28 enhances the quality of noise suppression. In particular, the described order biases the averaging to 50% of the center pixel being filtered, pixel $L_{x,y}$. In addition, the order in which the pixels are included in the running averages prevents forward diffusion of noise and prevent the accumulation of rounding errors which may be significant with low dynamic ranges. Although both of methods 400 and 500 described above each perform noise suppression using the closest four similarly colored pixels, in other embodiments, methods 400 and 500 may alternatively be extended to use a larger neighborhood of similarly colored pixels about the center pixel. For those center pixels undergoing noise suppression where one or more of the neighboring pixels and their illuminance values are not available, such as at the frame boundaries, the equations may be suitably altered to accommodate the missing information. Substitute pixel values can be determined, and used in the equations, by various boundary-condition rules for-2 dimensional image processing. For example, one such boundary-condition rule is to replace the missing pixels with the center pixel $L_{x,y}$.

Overall, method 100 utilizes subtraction with noise suppression to effectively flatten non-uniform illumination. As a result, lower quality or less expensive diffusers may be utilized. As noted above, lower-cost, less powerful lamps may also be utilized.

Methods 400 and 500 suppress noise without utilizing pre- or post processing. Suppression is done in situ were more information is available to decide how to suppress noise. The suppression adapts to the ambient light level and to non-uniform lamp illumination. In high ambient or low lamp illumination regions, the methods apply a stronger smoothing filter. In low ambient or bright illumination regions, the methods apply a speckled removal filter, a weak filter better at maintaining edges. In addition, methods 400 and 500 facilitate fast processing in firmware. The suppression scheme of methods 400 and 500 trades processing time for image quality when appropriate.

Although the present disclosure has been described with reference to example embodiments, workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

What is claimed is:

1. A method comprising:
digitally capturing a first image frame of a scene in the presence of a flash and ambient light to produce pixels of the scene, wherein the pixels each have a composite illuminance value from the first image frame;
digitally capturing a second image frame of the scene in presence of ambient light without a flash, wherein the pixels of the scene each have an ambient only illuminance value from the second image frame; and
for each pixel of the scene:
(a) determining a flash only illuminance value by subtracting the ambient only illuminance value from the composite illuminance value; and
(b) determining a filtered illuminance value by applying one of a plurality of different levels of noise suppression to the flash only illuminance value based on the difference between the composite illuminance value and the ambient only illuminance value.

2. The method of claim 1, wherein the first image frame and the second image frame are each in a raw image format of a camera and wherein the determining uses the raw image format.

3. The method of claim 1 further comprising providing the flash with at least one light emitting diode flash lamp.

4. The method of claim 1, wherein the flash has a luminance of less than or equal to about 1500 LUX.

5. The method of claim 1, wherein the flash has a luminance of less than or equal to about 900 LUX.

6. The method of claim 1, wherein the plurality of different levels of noise suppression comprises:
no suppression;
a first level of positive noise suppression; and
a second level of positive noise suppression greater than the first level of positive noise suppression.

7. The method of claim 1, wherein each of the plurality of different levels of noise suppression is provided with a plurality of different corresponding digital filters.

8. The method of claim 1, further comprising printing with a printer, displaying on a display, transmitting over a communication channel, or storing on a persistent storage device, the pixel with the filtered illuminance value.

9. The method of claim 1, wherein the pixels are in a two dimensional array of $L_{x=1\ to\ n,\ y=1\ to\ m}$, wherein the filtered illuminance values of the pixels are determined in raster order and wherein said one of the plurality of different noise suppression levels applied to a pixel $L_{x,y}$ comprises clamping the flash only illuminance value for the pixel $L_{x,y}$ between a maximum of filtered illuminance values of the pixels $L_{x-1,\ y-1}$ and $L_{x+1,\ y-1}$ and flash only illuminance values of the pixels $L_{x-1,\ y+1}$ and $L_{x+1,\ y+1}$ and a minimum of filtered illuminance values of the pixels $L_{x-1,\ y-1}$ and $L_{x+1,\ y-1}$ and flash only illuminance values of the pixels $L_{x-1,y+1}$ and $L_{x+1,\ y+1}$.

10. The method of claim 1, wherein the pixels are in a two dimensional array of $L_{x=1\ to\ n,\ y=1\ to\ m}$, wherein the filtered illuminance values of the pixels are determined in raster order and wherein said one of the plurality of different noise suppression levels applied to a pixel $L_{x,y}$ comprises clamping the flash only illuminance value for the pixel $L_{x,y}$ between a maximum of filtered illuminance values of the pixels $L_{x,\ y-2}$ and $L_{x-2,\ y}$ and flash only illuminance values of the pixels $L_{x+2,\ y}$ and $L_{x,\ y+2}$ and a minimum of filtered illuminance values of the pixels $L_{x,\ y-2}$ and $L_{x-2,\ y}$ and flash only illuminance values of the pixels $L_{x+2,\ y}$ and $L_{x,\ y+2}$.

11. The method of claim 1, wherein the pixels are in a two dimensional array of $L_{x=1\ to\ n,\ y=1\ to\ m}$, wherein the filtered illuminance values of the pixels are determined in raster order and wherein said one of the plurality of different noise suppression levels applied to a pixel $L_{x,\ y}$ comprises:
determining a first running average by averaging the filtered illuminance values of pixel $L_{x-1,\ y-1}$ and pixel $L_{x+1,\ y-1}$;
determining a second running average by averaging the first running average and the flash only illuminance value of pixel $L_{x-1,\ y+1}$;
determining a third running average by averaging the second running average and the flash only illuminance value of pixel $L_{x+1,\ y+1}$; and
averaging the third running average and the flash only illuminance value of pixel $L_{x,\ y}$.

12. The method of claim 1, wherein the pixels are in a two dimensional array of $L_{x=1\ to\ n,\ y=1\ to\ m}$, wherein the filtered illuminance values of the pixels are determined in raster order and wherein said one of the plurality of different noise suppression levels applied to a pixel $L_{x,\ y}$ comprises:
determining a first running average by averaging the filtered illuminance values of pixel $L_{x,\ y-2}$ and pixel $L_{x-2,\ y}$;
determining a second running average by averaging the first running average and the flash only illuminance value of pixel $L_{x+2,\ y}$;
determining a third running average by averaging the second running average and the flash only illuminance value of pixel $L_{x,\ y+2}$; and
averaging the third running average and the flash only illuminance value of pixel $L_{x,\ y}$.

13. The method of claim 1, wherein said one of the plurality of different levels of noise suppression that is applied to the flash only illuminance value is selected from the plurality different levels of noise suppression based on the difference between the composite illuminance value in the ambient only illuminance value.

14. The method of claim 2, where the raw image format is in a Bayer Mosaic space.

15. A method comprising:
digitally capturing a first image frame of a scene in the presence of a flash and ambient light to produce pixels of the scene, wherein the pixels each have a composite illuminance value from the first image frame;
digitally capturing a second image frame of the scene in presence of ambient light without a flash, wherein the pixels of the scene each have an ambient only illuminance value from the second image frame; and
for each pixel of the scene:
(a) determining a flash only illuminance value by subtracting the ambient only illuminance value from the composite illuminance value; and
(b) determining a filtered illuminance value by applying one of a plurality of different levels of noise suppression to the flash only illuminance value based on the difference between the composite illuminance value and the ambient only illuminance value, wherein the plurality of different levels of noise suppression comprises:
no suppression;
a first level of positive noise suppression; and
a second level of positive noise suppression greater than the first level of positive noise suppression, wherein the no suppression is applied when a difference between the composite illuminance value and the ambient only illuminance value is greater than a first predetermined threshold, wherein the first level of positive noise suppression is applied when the difference between the composite illuminance value and the ambient only illuminance value is less than or equal to a first predetermined threshold and greater than or equal to a second predetermined threshold less than the first predetermined threshold, and wherein the second level of positive noise suppression is applied when the difference between the composite illuminance value and the ambient only illuminance value is less than the second predetermined threshold.

16. The method of claim 15, wherein the second level of noise suppression continuously increases as the difference between the composite illuminance value and the ambient only illuminance value become increasingly less than the second predetermined threshold.

17. The method of claim 15, wherein the first level of noise suppression continuously increases as the difference between the composite illuminance value and the ambient only illuminance value approaches the second predetermined threshold.

18. The method of claim 15 further comprising providing the flash with at least one light emitting diode flash lamp.

19. The method of claim 16, wherein the plurality of different corresponding digital filters comprise a despeckle filter providing the first level of noise suppression and a smoothing filter providing the second level of noise suppression.

20. A method comprising:
digitally capturing a first image frame a scene in presence of a flash having a illuminance of less than or equal to 1500 LUX and ambient light to produce pixels of the scene, wherein the pixels each have a composite illuminance value from the first image frame;
digitally capturing a second image frame of the scene in presence of ambient light without a flash, wherein the pixels of the scene each have an ambient only illuminance value from the second image frame; and
for each pixel of the scene, while in a Bayer Mosaic space:
(a) determining a flash only illuminance value by subtracting the ambient only illuminance value from the composite illuminance value; and
(b) determining a filtered illuminance value by applying one of a plurality of different levels of noise suppression to the flash only illuminance value based on the difference between the composite illuminance value and the ambient only illuminance value.

21. The method of claim 20, wherein said one of the plurality of different levels of noise suppression that is applied to the flash only illuminance value is selected from the plurality different levels of noise suppression based on the difference between the composite illuminance value in the ambient only illuminance value.

22. An apparatus comprising:
one or more flash lamps;
one or more cameras; and
one or more processors configured to generate control signals causing the one or more cameras to:
digitally capture a first image frame of a scene in presence of a flash and ambient light to produce pixels of the scene, wherein the pixels each have a composite illuminance value from the first image frame;
digitally capture a second image frame of the scene in presence of ambient light without a flash, wherein the pixels of the scene each have an ambient only illuminance value from the second image frame, and
wherein the one or more processors is further configured to, for each pixel of the scene:
(a) determine a flash only illuminance value by subtracting the ambient only illuminance value from the composite illuminance value; and
(b) determine a filtered illuminance value by applying one of a plurality of different levels of noise suppression to the flash only illuminance value based on the difference between the composite illuminance value and the ambient only illuminance value.

23. The apparatus of claim 22, wherein said one of the plurality of different levels of noise suppression that is applied to the flash only illuminance value is selected from the plurality different levels of noise suppression based on the difference between the composite illuminance value in the ambient only illuminance value.

* * * * *